United States Patent [19]
Wallace

[11] Patent Number: 5,988,497
[45] Date of Patent: *Nov. 23, 1999

[54] METHOD FOR AUTHENTICATING CREDIT TRANSACTIONS TO PREVENT FRAUDULENT CHARGES

[75] Inventor: Michelle H. Wallace, Colorado Springs, Colo.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/655,501

[22] Filed: May 30, 1996

[51] Int. Cl.$^6$ .................................................. G06K 5/00
[52] U.S. Cl. ................................. 235/382.5; 235/379
[58] Field of Search ................................. 235/379, 380, 235/382.5

[56] References Cited

U.S. PATENT DOCUMENTS

| | | | |
|---|---|---|---|
| 4,720,860 | 1/1988 | Weiss | 380/23 |
| 4,812,628 | 3/1989 | Boston et al. | 235/379 |
| 5,109,408 | 4/1992 | Greenspan et al. | 379/197 |
| 5,130,519 | 7/1992 | Bush et al. | 235/380 |
| 5,168,520 | 12/1992 | Weiss | 380/23 |
| 5,177,342 | 1/1993 | Adams | 235/379 |
| 5,239,583 | 8/1993 | Parrillo | 235/380 |
| 5,251,259 | 10/1993 | Mosley | 235/380 |
| 5,311,594 | 5/1994 | Penzias | 380/23 |
| 5,317,636 | 5/1994 | Vizcaino | 380/23 |
| 5,345,380 | 9/1994 | Babson, III et al. | 364/400 |
| 5,513,250 | 4/1996 | McAllister | 379/91 |
| 5,530,235 | 6/1996 | Stefik et al. | 235/492 |
| 5,583,864 | 12/1996 | Lightfoot et al. | 370/396 |
| 5,615,408 | 3/1997 | Johnson et al. | 455/33.1 |
| 5,617,470 | 4/1997 | De Pasquale | 379/114 |
| 5,627,355 | 5/1997 | Rahman et al. | 235/380 |

Primary Examiner—Donald Hajec
Assistant Examiner—Mark Tremblay

[57] ABSTRACT

A dynamic authentication process having multiple tiers of validation. A first tier of validation authenticates the credit transaction based upon static personal identification numbers. If this first tier of validation is satisfied, a threshold determination is made as to whether a secondary tier of validation is required. These thresholds are defined by either the service provider or the card holder to address the additional costs of a second tier of validation.

4 Claims, 2 Drawing Sheets

METHOD FOR AUTHENTICATING CREDIT TRANSACTIONS TO PREVENT FRAUDULENT CHARGES

BACKGROUND OF THE INVENTION

1. Field of the Invention

The present invention relates generally to methods for validating transactions, and more specifically the present invention is directed toward a dynamic method for credit authentication.

2. Related Art

Credit card, calling card, and bank card fraud cost businesses (and consumers) millions of dollars annually. Current security mechanisms are not fail-safe, and protection mechanisms for consumers and businesses require improvement to stem these fraud-related losses.

Today, the validation of credit transactions is ineffective to deter persons intent on committing fraud. For example, anyone with a credit card number and expiration date can charge to the account when ordering by phone or by computer dial-up. This problem is further exacerbated by the ease with which credit card numbers can be obtained. One need simply sift through the trash for discarded statements, receipts, and carbons to obtain valid credit card numbers.

Calling card transactions exhibit similar problems. For example, calling card numbers are routinely "surfed" at airports by people watching over the shoulders of card users as they key in the calling card number. Thereafter, the calling card number is distributed and rampant fraud results.

One conventional method for combating fraud has been the provision of static personal identification numbers (PINs). Typically, these PINs are defined by the user to reflect personal information (e.g., birth date, anniversary date, etc.). While the personalization of these PINs aids the user in remembering these numbers, it also aids a person in guessing the PINs. This security risk increases when users define the same PINs for multiple cards.

SUMMARY OF THE INVENTION

The present invention satisfies the above mentioned needs by providing a validation method that uses variable personal identification numbers (PINs). These variable PINs are generated by a user-held device that changes the displayed number periodically (e.g., every 60 seconds). At the validation site or a third party site, a system can generate reference PINs that change in the same manner as the PINs displayed on the user-held device. The acquisition of the variable PIN is therefore useless to a potentially fraudulent user beyond the brief period of time that the variable PIN is displayed on the user-held device.

Although these user-held devices can reduce potential fraud in every card transaction, the implementation of this new technology comes with a variety of costs (e.g., implementation, administrative, educational, convenience, etc.). The aggregate combination of these costs could outweigh the intended benefits sought to be achieved. Accordingly, the present invention identifies a dynamic validation process that authenticates credit transactions on multiple tiers. In a preferred embodiment, the dynamic validation process includes two tiers.

In the first tier of the validation process, the system validates the proposed credit transaction based upon a static sequence of PINs. Specifically, after receiving a PIN from a user, the system determines whether the received PIN matches a predefined PIN stored in a database. If no match is identified, an invalidation result can be returned. If a match is identified, the system determines whether the credit transaction requires a second tier of validation.

The necessity of a second tier of validation could be prompted by numerous threshold criteria or conditions. Examples of threshold criteria include transaction amount, credit limit, frequency of use, or the like. Examples of conditions include changes in purchasing patterns (e.g., change in shipping address), geographical limitations, or the like. The class of conditions can also include any boolean combination of two or more thresholds or conditions. These thresholds or conditions can be set by the service provider or customized individually by the card holder. In either case, suitable scenarios can be defined where the expense of a second tier of validation is justified.

If no threshold criteria are exceeded or no conditions are satisfied, the transaction is authenticated based solely upon the first tier of the validation process. However, if any one of a set of predefined thresholds are exceeded or any one of a set of predefined conditions are met for the card holder's account, the second tier of validation is invoked. In this second tier of validation, the user is prompted for a variable PIN generated by a user-held device. This variable PIN is compared to a synchronously generated variable PIN. The system that synchronously generates a variable PIN can reside at the validation site or at a separate site connected by a network. If a match occurs, the dynamic validation process authenticates the credit transaction.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Figure 1:
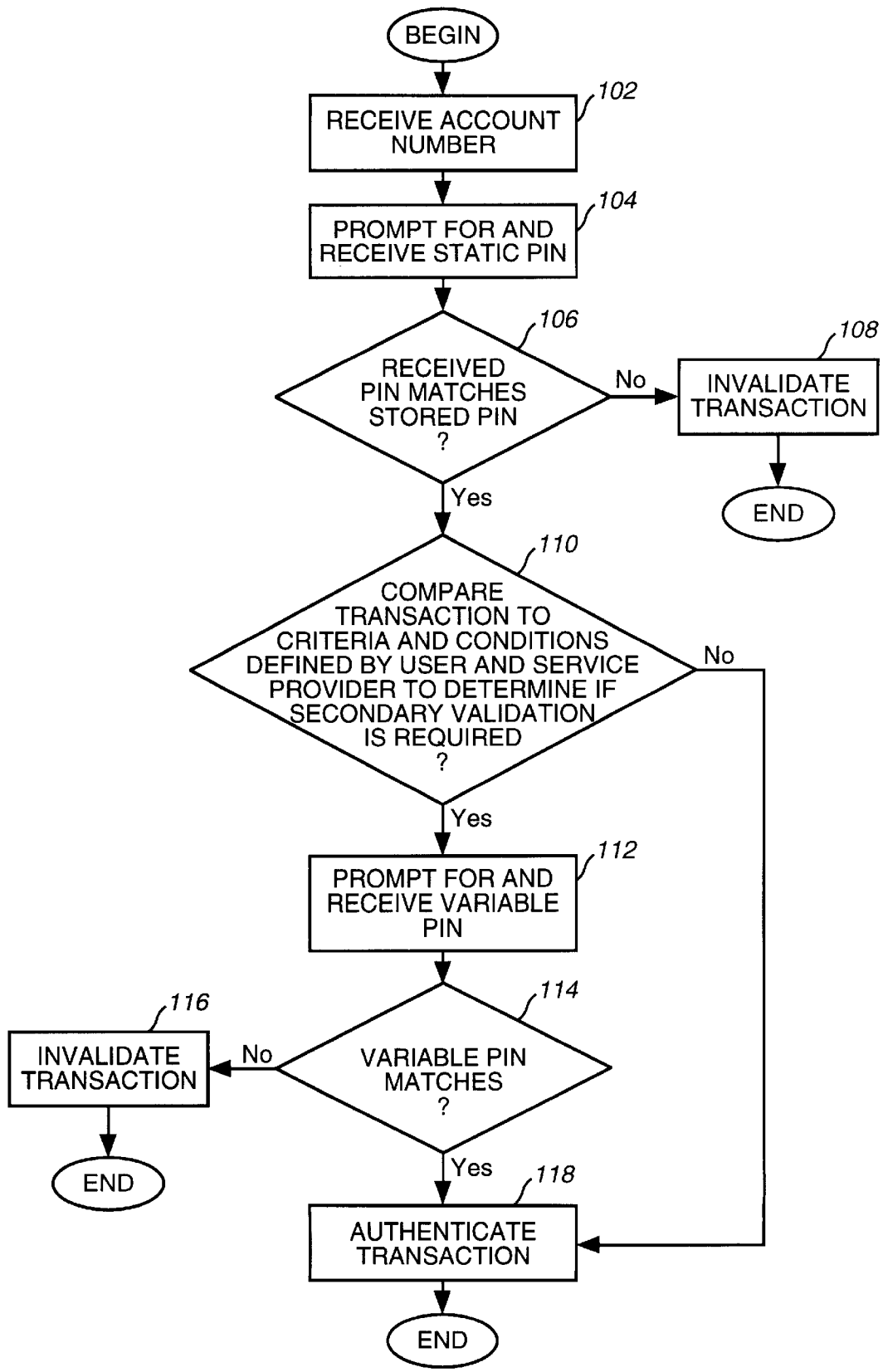
FIG. 1 illustrates a preferred embodiment of a dynamic validation process.

Optimal solutions that address the expanding fraud problem require consideration of multiple factors. Generally, this analysis must determine the magnitude of the problem sought to be addressed relative to the cost of the proposed solution. Costs associated with any solution include the technical costs of the fraud prevention mechanism, the administrative costs of implementing the new system, the costs of educating the public on using the new system, etc. Clearly, if the costs of the proposed solution outweigh the anticipated benefits, the implementation of the proposed solution may not be justified.

In the context of calling cards, credit cards, and bank cards, fraudulent transactions have varying exposures (or costs). For example, fraud on a calling card based upon a plurality of originations of international calls may incur hundreds or thousands of dollars in fraudulent charges over a period of time. Credit cards, on the other hand, are generally perceived as more critical than calling cards and can potentially incur thousands of dollars of liability based on a single transaction. This exposure level depends upon the credit limit of the credit card. Finally, fraudulent use of bank cards can place hundreds or thousands of dollars at risk depending upon the account balance and any predefined withdrawal limits. One can readily appreciate that these transaction-based services provide corporations and individuals with varying exposures to fraud.

Addressing these exposures to fraud begins through the recognition of potential flaws in each transaction authentication. As noted above, authentication is based upon the verification of a static sequence of identifying numbers. For example, a credit card transaction can be verified by the expiration date, a calling card transaction can be verified by the calling card number, and a bank card can be verified by a predefined PIN. In each of these cases, once the static sequence of identifying numbers is discovered or acquired, fraud can immediately commence. This fraudulent activity continues until the account is deactivated.

To prevent this fundamental flaw in conventional authentication systems, the present invention uses a variable sequence of identifying numbers (or variable PIN). As compared to a static predefined PIN, the variable PIN is generated by a user-held device as part of a sequence of randomly generated numbers. This variable PIN is displayed on the user-held device and changes periodically (e.g., every 60 seconds). At either the validation site or a third party site, a matching variable PIN is synchronously generated. Authentication proceeds upon the comparison of the variable PIN supplied by the card holder and the synchronously generated variable PIN available at the validation site. An example of this authentication device is the Secured Card produced by Security Dynamics, Cambridge, Mass.

As one can appreciate, the use of a variable PIN prevents numerous fraudulent activities. Specifically, since the variable PIN is valid for only a short period of time (e.g., 60 seconds), actual possession of the user-held device that generates the variable PIN is required for fraud to commence. For example, consider the case of calling card fraud. If a variable PIN replaces at least part of the calling card number, a person that steals the number (e.g., peering over your shoulder) can use it only for a brief period of time, typically under a minute. Effectively, this class of fraud is eliminated altogether. Similar effects on credit card and bank card fraud also result.

Generally, the requirement of actual possession of the user-held device deters most instances of "casual" fraud. In this context, "casual" fraud refers to those situations where no crimes are committed directly against the card holder. In other words, barring theft of the user-held device, fraud cannot commence. Even if this is an option for a potentially fraudulent user, theft of a card holder's wallet may not be enough. In other embodiments, the user-held device may be in compact form such as a key fob. In this case, the potentially fraudulent user would have to steal a wallet and the key fob. At this increased level of fraud activity, the costs of increased personal security clearly outweigh the intended benefits.

Further with respect to a cost-benefit analysis, the costs of use of the variable PIN itself requires consideration. In this new application of variable PIN technology, the costs of the user-held variable PIN device, the costs of updating existing validation systems, the costs of educating the card holders, etc. must be considered. After the aggregate sum of these costs are determined, the variable PIN technology may not be justified for particular applications. More specifically, some uses within a particular service class (i.e., calling card, credit card, or bank card), may not justify the use of the technology.

A similar cost-benefit analysis will also be performed by the card holder. Potential considerations include the costs of purchasing the device, the costs of carrying the additional device, the costs of using the device, etc. Both the costs of carrying the device and the costs of using the device are largely one of convenience. Card holders may therefore reject the use of a valuable technology because of the perceived inconvenience relative to the expected benefit.

In light of these considerations, the present invention contemplates a dynamic validation process that is sensitive to the needs of both the corporations providing the card services and the individuals who use those card services. In this dynamic validation process, the variable PIN technology is automatically invoked as a second tier of validation based upon the satisfaction of predefined conditions. Numerous possible alternatives in specifying predefined conditions exist. The following illustrations are merely exemplary and do not represent an exhaustive list of possible uses.

Consider first the perspective of a card provider. In many instances, card providers will assume the liability incurred for fraudulent charges. Accordingly, the card provider has a direct financial benefit in eliminating fraudulent usages. However, these financial benefits are directly proportional to the level of fraud which can range from hundreds to thousands of dollars. In considering a cost-benefit analysis, card providers can more easily justify the elimination of the higher levels of fraud first. These higher levels of frauds can be characterized by various indicia associated with any particular transaction.

For example, prevention of a fraudulent transaction for an amount above a given threshold (e.g., $500) can be more easily justified as compared to prevention of a fraudulent transaction of $30. As an alternative to targeting values of individual transactions, the card provider may also want to target transactions on specific cards. For example, the card provider can require a second tier of validation (i.e., variable PIN) only for transactions on credit cards having a credit limit over a predefined threshold (e.g., $5,000). This example could result from a possibility that fraudulent activity is focused primarily upon gold cards. Clearly, the card provider could specify a combination of threshold criteria (e.g., credit limit over $5,000 and transaction over $1,000). Instead of confining the monitoring to a single transaction, the card provider could even track historical card usage. For example, if the average charge is under $100, a string of $300 charges could trigger the second tier of validation.

Additionally, a card provider may wish to target transactions that are more likely to be fraudulent or presumptively fraudulent. For example, the card provider can automatically initiate a second tier of validation if a transaction that exceeds a credit limit has been attempted. In another example, the card provider can automatically initiate a second tier of validation if a transaction associated with a card that has been previously identified as lost but not yet deactivated. In this scenario, an access to a database could identify the status of a field in a database record associated with that card.

In considering the perspectives of a card holder, further modifications to the validation process can result. For example, the card holder can determine whether the service is desired at all. If the card holder is liable for all fraudulent uses, the use of variable PIN technology becomes a form of insurance. Some users may justify the additional service based on spending levels while other users may not. The system could therefore determine, based upon a field in a database record associated with that card, whether the second tier of validation has been selected by the card holder.

The card holder can further control the dynamically defined validation process by specifying an arbitrary set of conditions. These conditions can be based upon a combination of convenience and potential liability. For example, the card holder can specify that only transactions over $100 would initiate the second tier of validation. In this case, the card holder may assume that the majority of his transactions will be below that threshold thereby eliminating the necessity of dealing with the second tier of validation.

In the context of bank cards, the card holder could specify a geographical condition. For example, the cardholder could specify that the second tier of validation should be initiated only if an ATM machine outside a predefined set of ATM machines is used. All uses within the predefined set of ATM machines would bypass the second tier of validation, thereby enhancing the convenience of use. Thus, if the bank card is stolen with knowledge of the static PIN, the fraudulent user would be precluded from using the card at locations outside of the predefined set.

Further with respect to convenience, the card holder could specify that the second tier of validation should be invoked periodically. For example, the second tier of validation could be automatically invoked on every fifth transaction. In this manner, only a limited number of fraudulent uses could occur before a variable PIN must be provided. If the fraudulent user cannot provide the variable PIN on that predefined periodic transaction, all subsequent transactions would similarly require the second tier of validation. This mechanism would effectively end the fraudulent use on that card.

In addition to the prevention of fraudulent activity, the variable PIN could also be used to authenticate special transactions. For example, if a predefined ATM limit is $200 but the user needs $500, the variable PIN could be used to override the previously defined limit.

As one can readily appreciate, numerous other examples exist. Moreover, any boolean combination of conditions could be used to specify when the second tier of validation is invoked. This dynamic validation process is described by the flow chart of FIG. 1.

In FIG. 1, the two-tiered validation process begins in step 102 where the system receives a card number from a card holder. Next, in step 104, the system prompts the card holder for a static predefined PIN. In the context of calling cards, the static predefined PIN may exist as a part of the card number itself that is provided to the system. After the static PIN is received, the system determines in step 106 whether the static PIN matches the PIN stored in a database for that account number. If the PINs do not match, the proposed transaction is invalidated in step 108. Alternatively, the card holder could be given additional chances to provide a correct PIN.

If the system determines in step 106 that the PINs do match, the initial validation phase is satisfied. This initial validation phase represents the minimal requirements for authenticating the transaction. As noted above, these minimal requirements are often unsatisfactory. Accordingly, the present invention contemplates the use of a second tier of validation. The invocation of this second tier is based upon a variety of considerations exemplified by those discussed above. Significantly, the criteria for invoking additional validation can be based on service provider and/or card holder definitions. This definition process enables the dynamic validation process to be customized based upon any parameter or parameters relating to a particular transaction or sequence of transactions. These general use considerations can include any predefined generic class of thresholds or conditions.

If one or more thresholds are exceeded (or conditions met) as identified by the determination in step 110, the system then prompts the card holder for a variable PIN in step 112. In various embodiments, the card holder is automatically prompted by a voice response unit (VRU) for computer ordering or calling card use, by an automated teller machine (ATM) for ATM withdrawals, by a computer program when conducting monetary transactions over a computer network (e.g, Internet), etc. In each case, a number can be easily entered on all current authentication devices (e.g., phone key pad, computer key board, etc.) that require input of a transaction amount.

Upon receipt, the system determines whether the received variable PIN matches a synchronously generated PIN produced at the validation site or a third party site. If it is determined in step 114 that the variable PINs do not match, the transaction is invalidated in step 116 Alternatively, the card holder could be given additional chances to provide a correct variable PIN. Generally, the invalidation of the transaction in step 116 could also be accompanied by action that labels that particular card as being presumptively fraudulent. This labeling is accomplished through the update of a database record associated with that particular card. After being labeled as presumptively fraudulent, each successive transaction that is based on that card will require the second tier of validation. If the card holder is in the immediate vicinity, the card could also be confiscated.

Finally, if the system determines in step 114 that the second tier of validation is satisfied, the transaction is authenticated in step 118. Alternatively, if the system determines in step 110 that the first tier of validation is satisfied and the second tier of validation is not required, the system will also validate the transaction. This latter case represents the dynamic nature of the validation process that can be customized based upon the general considerations described above with respect to the cost-benefit analysis. As also noted above, these considerations can be viewed from the perspective of either the service provider or the card holder.

Figure 2:
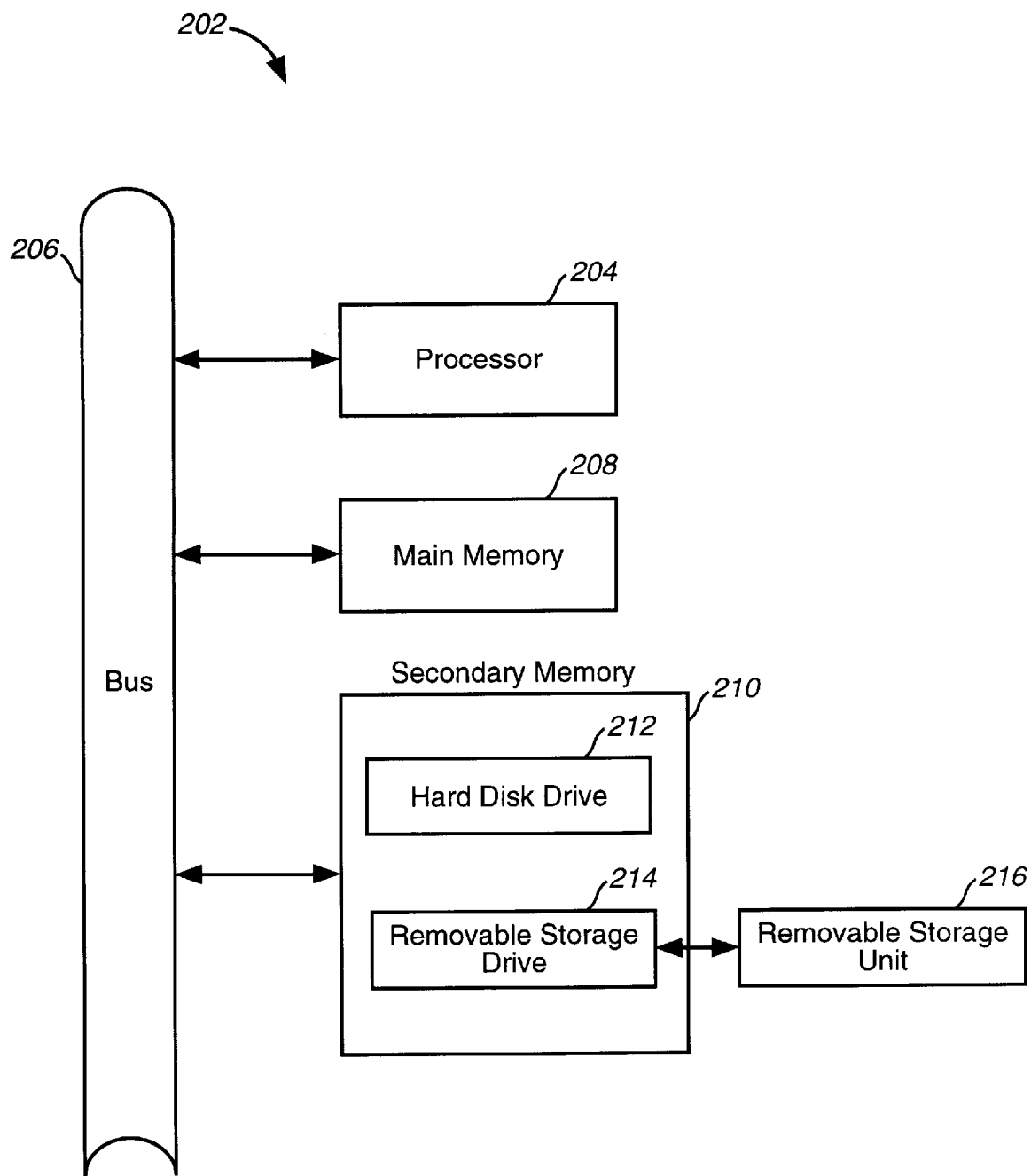
FIG. 2 illustrates a block diagram of a computer useful for implementing elements of the present invention.

In one embodiment, the invention is directed to a computer system operating as discussed herein. An exemplary computer system 202 is shown in FIG. 2. The computer system 202 includes one or more processors, such as processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, etc. The removable storage drive 214 reads from and/or writes to a removable storage unit 218 in a well known manner.

Removable storage unit 218, also called a program storage device or a computer program product, represents a floppy disk, magnetic tape, compact disk, etc. As will be appreciated, the removable storage unit 218 includes a computer usable storage medium having stored therein computer software and/or data.

Computer programs (also called computer control logic) are stored in main memory and/or the secondary memory 210. Such computer programs, when executed, enable the computer system 202 to perform the features of the present invention as discussed herein. In particular, the computer programs, when executed, enable the processor 204 to perform the features of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A dynamic validation method for authenticating monetary transactions, the method comprising the steps of:
   (1) receiving an account number for a transaction from a user;
   (2) prompting said user for a static personal identification number for initial validation of an identity of said user;
   (3) receiving a static personal identification number from said user;
   (4) determining whether said received static personal identification number matches a predefined personal identification number stored in a database whereby said identity of said user is initially validated;
   (5) if said step (4) initially validates said identity of said user, determining whether said transaction requires a secondary validation of said identity of said user, wherein said determination includes a comparison of one or more parameters of said transaction to at least one predefined threshold criterion or condition, wherein said criterion and said condition are definable by said user and a service provider;
   (6) if said step (5) determines that said secondary validation of said identity of said user is required, prompting said user for a first variable personal identification number;
   (7) receiving said first variable personal identification number from said user; and
   (8) authenticating said transaction if said first variable personal identification number matches a second variable personal identification number that is synchronously produced by a service provider.

2. A dynamic validation system for authenticating monetary transactions, comprising:
   a variable personal identification number authentication system that is capable of generating a variable personal identification number synchronously with the changes in a variable personal identification number displayed on a user-held device;
   a first tier validation system that receives a first static personal identification number from a user and compares said first static personal identification number with a second static personal identification number stored in a database for initial validation of an identity of said user; and
   a second tier validation system that receives a first variable personal identification number from said user and compares said first variable personal identification number with a second variable personal identification number that is generated by said variable personal identification number authentication system for secondary validation of said identity of said user, wherein said second tier validation system is activated based upon a comparison of one or more parameters of a transaction to at least one predefined threshold criterion or condition, wherein said criterion and said condition are definable by said user and a service provider.

3. A system for validating a transaction comprising:
   means for receiving a first static personal identification number from a card holder and comparing said first static personal identification number with a second static personal identification number stored in a database for initial validation of a transaction;
   means for storing predefined transaction threshold criteria in said database;
   means for comparing said initially validated transaction with said threshold criteria;
   means for determining when any of said threshold criteria has been exceeded;
   means for determining subsequent to said initial validation, whether said transaction should be allowed or rejected based on exceeding any of said predefined threshold criteria; and
   means for allowing said card holder to override said predefined criteria prior to said transaction being rejected by said means for determining.

4. The system according to claim 3, wherein said means for allowing comprises means for entering a first variable personal identification number.

* * * * *